(12) United States Patent
Sardar

(10) Patent No.: US 6,734,649 B1
(45) Date of Patent: May 11, 2004

(54) DYNAMIC TUNING OF CURRENT LOOP CONTROLLER FOR A PERMANENT MAGNET BRUSHLESS MOTOR

(75) Inventor: Hemant M. Sardar, Farmington Hills, MI (US)

(73) Assignee: TRW Automotive U.S. LLC, Cleveland, OH (US)

(*) Notice: Subject to any disclaimer, the term of this patent is extended or adjusted under 35 U.S.C. 154(b) by 0 days.

(21) Appl. No.: 10/338,354

(22) Filed: Jan. 8, 2003

(51) Int. Cl.[7] ............................................... G05B 11/36
(52) U.S. Cl. ........................ 318/609; 318/432; 318/783
(58) Field of Search ................................. 318/254, 609, 318/439, 138, 432, 433, 783

(56) References Cited

U.S. PATENT DOCUMENTS

| | | | |
|---|---|---|---|
| 5,187,417 A | * | 2/1993 | Minnich et al. ............ 318/254 |
| 5,361,024 A | | 11/1994 | Wisner et al. |
| 6,046,560 A | | 4/2000 | Lu et al. |
| 6,064,172 A | * | 5/2000 | Kuznetsov ................. 318/716 |
| 6,107,767 A | | 8/2000 | Lu et al. |
| 6,211,631 B1 | | 4/2001 | Wilson-Jones et al. |

FOREIGN PATENT DOCUMENTS

EP 0 778 660 6/1997

* cited by examiner

*Primary Examiner*—Karen Masih
(74) *Attorney, Agent, or Firm*—MacMillan, Sobanski & Todd, LLC

(57) ABSTRACT

A motor current controller for a permanent magnet AC motor achieves a decrease in bandwidth variations that would otherwise be caused by temperature changes. The current controller dynamically modifies the integral gain of a proportional-integral regulator in response to temperature-induced changes in motor resistance. The integral gain value is calculated to maintain a substantially constant loop bandwidth within a current loop primarily comprising the permanent magnet AC motor, semiconductor switches connected in an H-bridge configuration, and the proportional-integral regulator.

18 Claims, 3 Drawing Sheets

DYNAMIC TUNING OF CURRENT LOOP CONTROLLER FOR A PERMANENT MAGNET BRUSHLESS MOTOR

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to permanent magnet alternating current (PMAC) motor controls, and, more specifically, to a digital motor current controller for a permanent magnet AC motor having reduced bandwidth variations caused by temperature changes.

Of all the physical environments where electric motors are used, the automotive vehicle environment is one of the harshest. Operating temperatures for non-engine components can range from very cold to very hot (e.g., from about −20° C. to about +50° C.). An electric motor used in this environment must operate within its specified performance over this full temperature range.

Electric power assist steering systems are well known in the art. These systems often utilize a rack and pinion gear set to provide power assist by using an electric motor to either (i) apply rotary force to a steering shaft connected to a pinion gear, or (ii) apply linear force to a steering member having the rack teeth thereon. The electric motor in such systems is typically controlled in response to (i) a driver's applied torque to the vehicle steering wheel, and (ii) sensed vehicle speed. The motor may comprise a PMAC motor, a brush-type motor, or a variable reluctance motor depending upon the application and its requirements.

Ideally, the electric motor and control system of an electric assist steering system will have a bandwidth greater than that of the steering system itself so that the response of the electric motor does not negatively impact the stability or performance of the steering system. A substantially constant bandwidth of the motor control current loop is desirable so as to achieve consistent performance over a larger range of motor conditions, especially with regard to temperature variations.

Resistance of the copper windings in a permanent magnet AC motor changes with temperature. The changed response has the undesirable effect of narrowing the closed loop bandwidth of the current control loop. Therefore, the controller may require compensation for temperature changes depending upon how much impact the reduction in bandwidth has on the system performance.

SUMMARY OF THE INVENTION

The present invention has the advantages of compensating for motor resistance variations with temperature to assure a consistent response of a PMAC motor for use in a harsh temperature environment. In particular, the motor resistance variations is compensated by tuning of the motor control current loop integral gain.

In one aspect of the invention, a motor current controller controls an instantaneous current flow in a permanent magnet AC motor via a switching bridge in response to a current command from a main motor controller, an instantaneous current value from a motor current sensor, and a temperature signal from a motor temperature sensor. The motor current controller comprises a difference element comparing the current command and the instantaneous current value to generate an error signal. A proportional-integral regulator generates a command signal for controlling the switching bridge in response to the error signal, wherein the proportional-integral regulator includes a proportional gain value and an integral gain value. A gain control circuit generates the integral gain value and loads the integral gain value into the proportional-integral regulator. The integral gain value is determined in response to the temperature signal so that a current loop comprising the motor, the switching bridge, and the proportional-integral regulator maintains a substantially constant loop bandwidth.

DETAILED DESCRIPTION OF PREFERRED EMBODIMENTS

Figure 1:
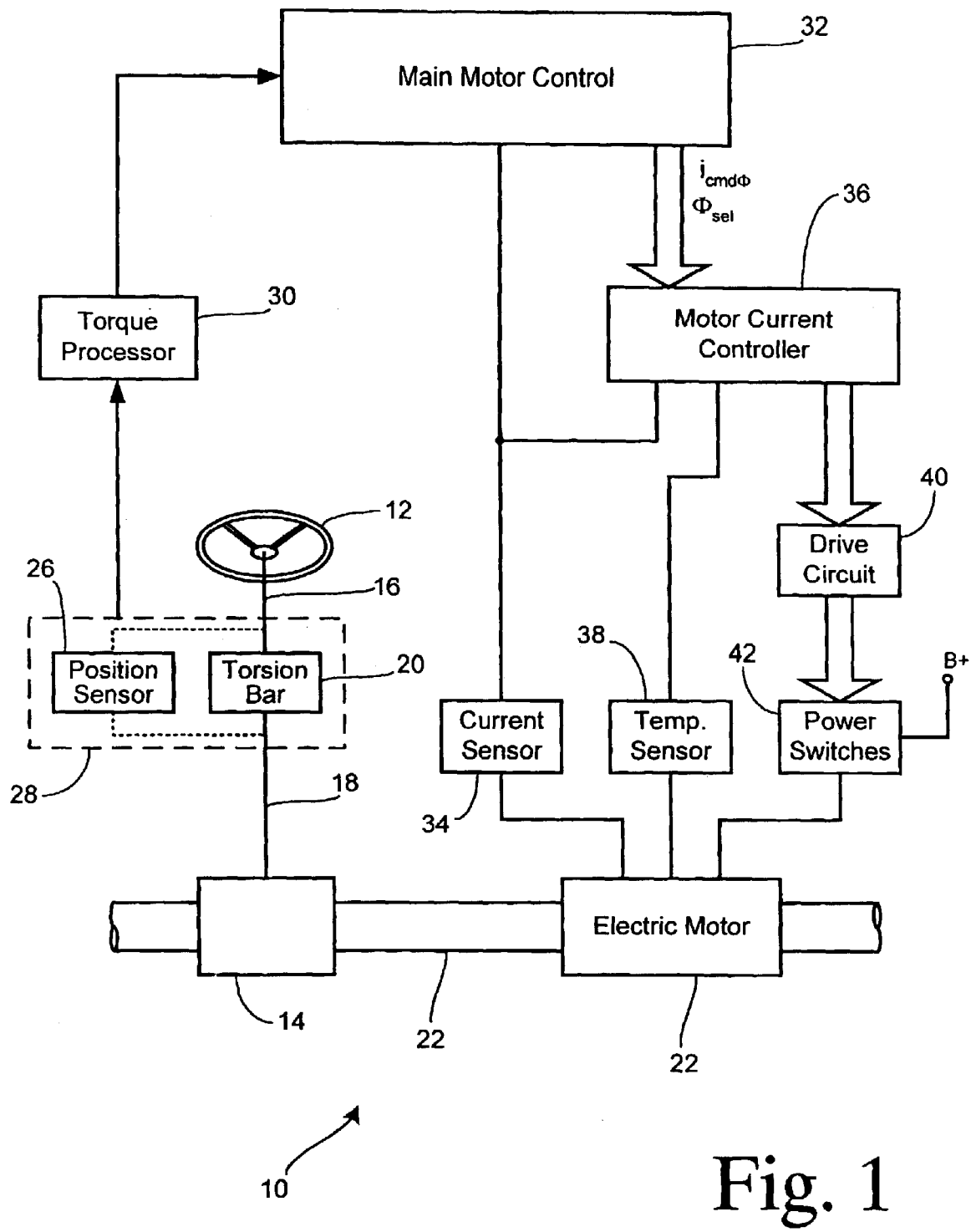
FIG. 1 is a schematic block diagram illustrating a power assist steering system in accordance with the present invention.

Referring to FIG. 1, a power assist steering system 10 includes a steering wheel 12 operatively connected to a pinion gear 14. Specifically, the vehicle steering wheel 12 is connected to an input shaft 16 and the pinion gear 14 is connected to an output shaft 18. The input shaft 16 is operatively coupled to the output shaft 18 through a torsion bar 20.

The torsion bar 20 twists in response to applied steering torque thereby permitting relative rotation between the input shaft 16 and the output shaft 18. Stops, not shown, limit the amount of such relative rotation between the input and output shafts in a manner known in the art.

As is well known in the art, pinion gear 14 has helical teeth, not shown, which are meshingly engaged with straight cut teeth, not shown, on a rack or linear steering member 22. The pinion gear 14 in combination with the straight cut gear teeth on the rack member 22 form a rack and pinion gear set. The rack is steerably coupled to the vehicle's steerable wheels with steering linkage in a known manner. When the steering wheel 12 is turned, the rack and pinion gear set converts the rotary motion of the steering wheel 12 into linear motion of the rack 22. When the rack moves linearly, the steerable wheels pivot about their associated steering axes and the vehicle is steered.

An electric assist motor 24 is operatively connected to the rack 22 through a mechanism such as a ball-nut drive arrangement, for example. When the electric motor 24 is energized, it provides power assist steering by aiding in the linear drive of the rack so as to aid in the rotation of the vehicle steering wheel 12 by the vehicle operator.

In accordance with the present invention, motor 24 is comprised of a PMAC motor. Motor 24 is preferably a three phase motor (which may have 9 stator slots and 6 rotor poles, commonly referred to as a "9-6" design). The stator poles are arranged so as to be energized in pairs thereby forming the 3 phases of the motor.

In many PMAC motors, controlling the direction of current flow through the motor windings controls direction of motor rotation. Current needs to be passed through the stator coils in only one direction independent of the desired direction of motor operation. The direction of motor rotation is controlled by the sequence in which the stator coils are energized.

Controlling the current through the stator coils controls the torque produced by the motor. When the assist steering motor is energized, the rotor turns which, in turn, rotates the nut portion of the ball-nut drive arrangement. When the nut rotates, the balls transfer a linear force to the rack. The direction of rack movement and, in turn, the direction of steering movement of the steerable vehicle wheels, is dependent upon the direction of rotation of the motor.

A steering shaft position sensor 26 is operatively connected across the steering input shaft 16 and the steering output shaft 18 and provides an electric signal having a value indicative of the relative rotational position or relative angular orientation between the input shaft 16 and the output shaft 18. The position sensor 26 in combination with the torsion bar 20 form a torque sensor 28 that provides a torque signal having a value indicative of the applied steering torque. The output of the torque sensor 28 is connected to a torque processor 30. Torque processor 30 monitors the applied steering torque angle, and knowing the spring constant of the torsion bar 20, provides an electric signal indicative of the applied steering torque to a main motor controller 32. The applied torque signal from torque processor 30 may be passed through a filtering circuit (not shown) of the type disclosed in U.S. Pat. No. 5,504,403.

Main motor control 32 receives a motor current signal from a current sensor 34 in additional to other input signals from other sensors (not shown) such as a motor rotor position sensor, a control system temperature sensor, and a vehicle speed sensor. Main motor control 32 provides a motor current demand signal $i_{cmd\Phi}$ and a phase select signal $\Phi_{sel}$ in response to the applied torque signal and other inputs as known in the art. The current demand signal may be determined from a look-up table in response to the measured parameters.

Main motor control 32 outputs the motor current demand signal $i_{cmd\Phi}$ and the phase select signal $\Phi_{sel}$ to a motor current controller 36. A motor temperature sensor 38 is operatively coupled to PM motor 24 and provides motor current controller 36 a signal indicative of the temperature of motor 24. The output from motor current sensor 34 also provides a motor current signal to motor current controller 36.

The output of motor current controller 36 controls the current provided to each motor phase through a drive circuit 40 which is controllably connected to a plurality of power switches 42. Power switches 42 are preferably comprised of field-effect-transistors ("FETs") and are operatively connected between the vehicle battery B+ and the stator coils of motor 24. Current flowing in the motor stator coils is controlled by pulse-width-modulating ("PWM") switches 42 connected in an H-bridge configuration as is known in the art.

Figure 2:
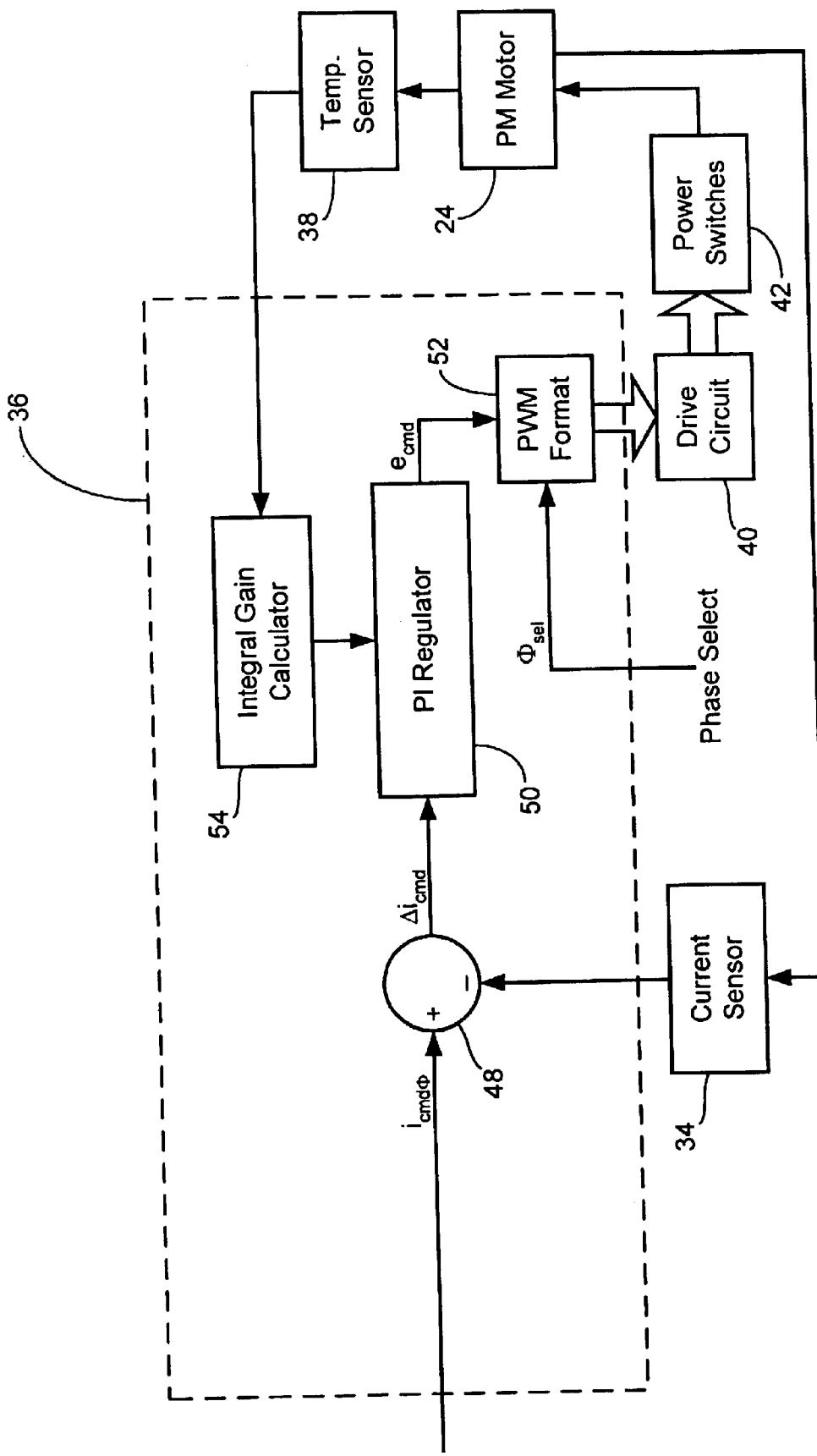
FIG. 2 is a schematic block diagram showing the digital motor current controller of FIG. 1 in greater detail.

Referring to FIG. 2, motor current controller 36 is shown in greater detail. Motor current controller 36 controls current to all phases of PM motor 24 by processing the current command signal $i_{cmd\Phi}$ and the phase select signal $\Phi_{sel}$ from main motor control 32. The purpose of motor current controller 36 is to maintain a consistent bandwidth that is independent of the motor operating parameters of rotor position, motor current, and motor temperature.

The current command $i_{cmd\Phi}$ from motor control 32 for a phase to be energized is connected to a positive input of a feedback summing junction 48. The negative input of the summing junction 48 is connected to receive an instantaneous current measurement signal from current sensor 34. The output of summing junction 48 is an error value $\Delta i_{cmd}$ which is equal to the value of the difference between the reference current command value and the sensed motor current value. Error value $\Delta i_{cmd}$ is connected to a proportional-integral ("PI") regulator 50. PI regulators are known in the art and are especially well adapted for controlling a PM motor in the present invention. PI controller 50 may preferably take the following form:

$$e_{cmd} = K_p \cdot \Delta i_{cmd} + \left(\frac{K_i}{s} \cdot \Delta i_{cmd}\right)$$

where $K_p$ and $K_i$ are the proportional and integral gains, respectively. Current error command $e_{cmd}$ is output from PI regulator 50 to a PWM formatter 52.

The open loop transfer function of the current loop (i.e., including the motor phase windings, harness wiring, the motor current controller, and the H-bridge power switches) can be expressed as:

$$G(s) = \left(\frac{1}{Ls + R}\right) \cdot \left(K_p + \frac{K_i}{s}\right) \cdot e^{-sT_d},$$

where L and R are the lumped motor inductance and resistance in the DQ-frame, and $T_d$ is the total time delay of the current loop.

As verified by root locus analysis, minimal variation in system bandwidth over temperature can be achieved by controlling integral gain to track changes in motor resistance. Therefore, an objective of the invention is to track the open loop zero at $s=-K_i/K_p$. In one embodiment, this is done by implementing a constant gain between the open loop zero and the open loop pole, expressed as follows:

$$\frac{K_i(T)}{K_p} = K' \cdot \frac{R(T)}{L}$$

where K' is the tracking gain and $K_i(T)$ and $R(T)$ are the integral gain and motor resistance, respectively, at a temperature T. Tracking gain K' would typically be chosen to be less than one due to the difficulty in accurately quantifying all the system parameters. The actual value used will depend on the accuracy of the various system measurements and the need for stability margins in the controller design. Preferably, K' has a value in the range of about $0.5 \leq K' < 1$.

The main component of the temperature-sensitive loop resistance is the motor copper resistance which is a function of temperature T as follows:

$$R(T) = R_{nom}(T_{nom}) + \Delta R(T)$$

where $T_{nom}$ is a nominal temperature (e.g., 20° C.), $R_{nom}(T_{nom})$ is nominal resistance at $T_{nom}$, and $\Delta R$ is the resistance change with temperature which is further given by:

$$\Delta R(T) = R_{nom}\left(\frac{1}{T_{nom} + C}\right)(T - T_{nom})$$

where C is a temperature coefficient which may be determined empirically for a particular motor.

Combining the above and solving for the instantaneous integral gain value to be used an a particular temperature yields:

$$K_i(T) = K_i(T_{nom}) + \left(K' \frac{K_p}{L}\right) \Delta R(T).$$

The nominal integral gain value $K_i(T_{nom})$ can be derived conventionally for obtaining a desired bandwidth and other properties. This equation is implemented in an integral gain calculator 54 in response to a temperature signal from temperature sensor 38. Based on the temperature signal, the integral gain value is thus calculated to maintain a substantially constant loop gain within a current loop primarily comprising the PM motor, the FET switches, and the PI regulator. In order to avoid stability problems, the integral gain value $K_i(T)$ may preferably be allowed to vary only within a predetermined range between a minimum value $K_i(min)$ and $K_i(max)$. Thus, if the above equation produces a value outside the range, then the integral gain value would be forced to the respective minimum or maximum value. Calculator 54 loads the calculated integral gain value into PI regulator 50.

Using the loaded integral gain value (and preferably a constant proportional gain value programmed into regulator 50), the current error command $e_{cmd}$ is output to PWM formatter 52. Phase select signal $\Phi_{sel}$ from controller 32 is also connected to PWM formatter 52. The output of PWM formatter 52 is controllably connected to the upper and lower switching FETs to control the PWM ON times for each of the motor phases to energize the motor in the desired direction with the desired torque.

Figure 3A:
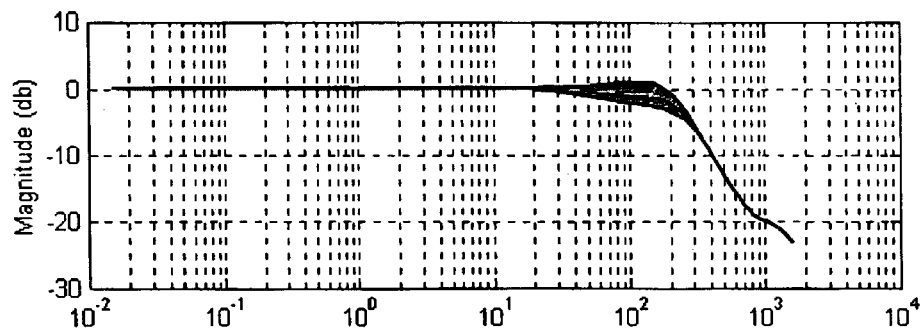
FIGS. 3a–3d are plots of frequency response for comparing performance of the present invention against a motor current controller wherein the integral gain is fixed.
Figure 3B:
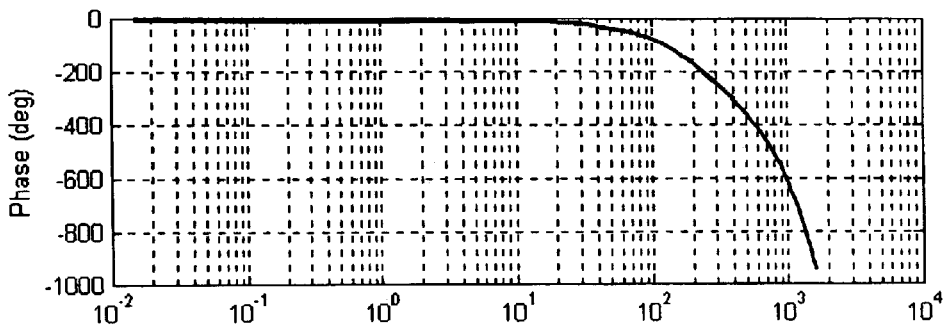
Figure 3C:
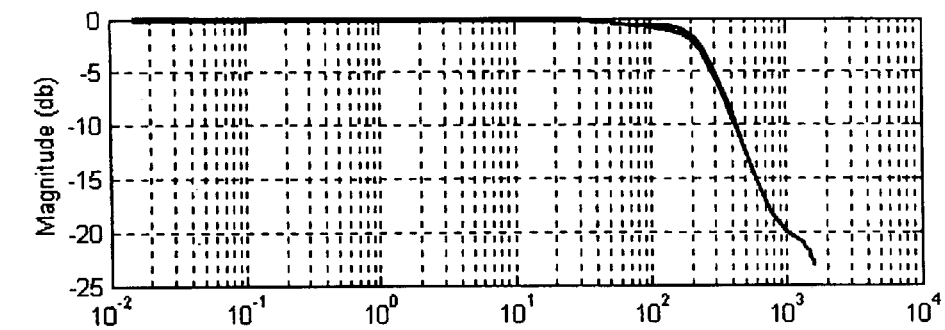
Figure 3D:
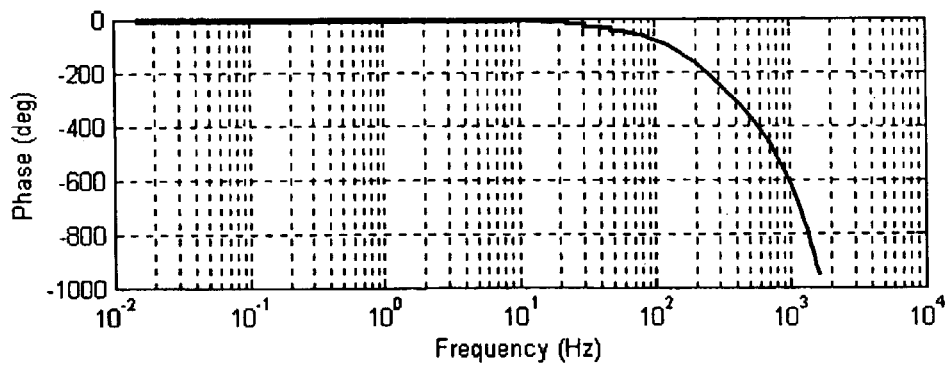

A specific example of the present invention will now be described. A nominal value for inductance L of 50 µH and a nominal resistance value R of 57 mΩ will be used with a total loop delay $T_d$ of 2.38 milliseconds and a proportional gain $K_p$ of 50. Tracking gain K' was selected to be 0.8 and a nominal integral gain value of 30 was chosen. FIGS. 3a–3d show results of a simulation done over a temperature range from −40° C. to +80° C. Over this temperature range, the resistance changes from 52.6 mΩ to 61.4 mΩ. FIGS. 3a and 3b show closed loop frequency response when the integral gain is not updated to track the resistance changes (i.e., K' is zero). In this case, the current loop bandwidth ranges from 254.7 Hz to 182.3 Hz at the extremes of the temperature and resistance values. FIGS. 3c and 3d shows the frequency response when integral gain tracking (K'=0.8) is used. In this case, the bandwidth ranges from 243.2 Hz to 229.6 Hz which is a much smaller range of variation.

What is claimed is:

1. A motor current controller for controlling an instantaneous current flow in a permanent magnet motor via a switching bridge in response to a current command from a main motor controller, an instantaneous current value from a motor current sensor, and a temperature signal from a motor temperature sensor, said motor current controller comprising:

a difference element comparing said current command and said instantaneous current value to generate an error signal;

a proportional-integral regulator generating a command signal for controlling said switching bridge in response to said error signal, said proportional-integral regulator including a proportional gain value and an integral gain value; and a gain control circuit for generating said integral gain value and loading said integral gain value into said proportional-integral regulator, said integral gain value being determined in response to said temperature signal so that a current loop comprising said motor, said switching bridge, and said proportional-integral regulator maintains a substantially constant loop bandwidth.

2. The motor current controller of claim 1 wherein said gain control circuit determines a change in resistance of said motor in response to said temperature signal, and then determines said integral gain value in response to said change in resistance.

3. The motor current controller of claim 2 wherein said change in resistance is estimated as a substantially linear function of said temperature signal.

4. The motor current controller of claim 2 wherein said integral gain value is determined as a substantially linear function of said change in resistance.

5. The motor current controller of claim 2 wherein said change in resistance is substantially determined according to a formula comprising:

$$\Delta R(T) = R_{nom}\left(\frac{1}{T_{nom} + C}\right)(T - T_{nom})$$

wherein T is said temperature signal, $\Delta R(T)$ is said change in resistance at temperature T, $R_{nom}$ is nominal resistance at a nominal temperature $T_{nom}$, and C is a temperature coefficient of said motor.

6. The motor current controller of claim 5 wherein said integral gain value is substantially determined according to a formula comprising:

$$K_i(T) = K_i(T_{nom}) + \left(K' \frac{K_p}{L}\right) \Delta R(T)$$

wherein $K_i(T)$ is said integral gain value determined for said temperature T, $K_i(T_{nom})$ is a nominal integral gain value at said nominal temperature $T_{nom}$, K' is a tracking gain, $K_p$ is said proportional gain value, and L is a lumped motor inductance of said motor.

7. The motor current controller of claim 6 wherein said proportional gain value $K_p$ is substantially constant.

8. The motor current controller of claim 6 wherein tracking gain K' is comprised of a constant value in a range of about 0.5 to, but not including, one.

9. The motor current controller of claim 1 wherein said integral gain value is limited to a range from a minimum integral gain value to a maximum integral gain value.

10. A method of controlling an instantaneous current flow in a permanent magnet motor supplied to windings of said motor via a switching bridge in response to a current command from a main motor controller, said method comprising the steps of:

sensing an instantaneous current value in said windings;

comparing said current command and said instantaneous current value to generate an error signal;

sensing a temperature of said motor;

generating an integral gain value for a proportional-integral regulator in response to said temperature so that a current loop comprising said motor, said switching bridge, and said proportional-integral regulator maintains a substantially constant loop bandwidth; and generating a command signal in said proportional-integral regulator in response to said error signal for controlling said switching bridge.

11. The method of claim 10 further comprising the step of:

determining a change in resistance of said motor in response to said temperature; and wherein said integral gain value is determined in response to said change in resistance.

12. The method of claim 11 wherein said change in resistance is estimated as a substantially linear function of said temperature.

13. The method of claim 11 wherein said integral gain value is determined as a substantially linear function of said change in resistance.

14. The method of claim 11 wherein said change in resistance is substantially determined according to a formula comprising:

$$\Delta R(T) = R_{nom}\left(\frac{1}{T_{nom} + C}\right)(T - T_{nom})$$

wherein T is said temperature, $\Delta R(T)$ is said change in resistance at temperature T, $R_{nom}$ is nominal resistance at a nominal temperature $T_{nom}$, and C is a temperature coefficient of said motor.

15. The method of claim 11 wherein said integral gain value is substantially determined according to a formula comprising:

$$K_i(T) = K_i(T_{nom}) + \left(K'\frac{K_p}{L}\right)\Delta R(T)$$

wherein $K_i(T)$ is said integral gain value determined for said temperature T, $K_i(T_{nom})$ is a nominal integral gain value at said nominal temperature $T_{nom}$, K' is a tracking gain, $K_p$ is said proportional gain value, and L is a lumped motor inductance of said motor.

16. The method of claim 15 wherein said proportional gain value $K_p$ is substantially constant.

17. The method of claim 15 wherein tracking gain K' is comprised of a constant value in a range of about 0.5 to, but not including, one.

18. The method of claim 10 wherein said integral gain value is limited to a range from a minimum integral gain value to a maximum integral gain value.

* * * * *